United States Patent [19]

Azzopardi et al.

[11] Patent Number: 4,900,219
[45] Date of Patent: Feb. 13, 1990

[54] CARTON LOADING AND UNLOADING METHOD WITH ADJUSTABLE PALLET

[76] Inventors: Michael J. Azzopardi, 14154 Reservation Rd., Salinas, Calif. 93908; John W. Skelton, 46 Nacional St., Salinas, Calif. 93901

[21] Appl. No.: 226,045

[22] Filed: Jul. 29, 1988

[51] Int. Cl.$^4$ .................. B65G 57/24; B65G 63/00
[52] U.S. Cl. ..................... 414/786; 206/600; 414/345; 414/608; 414/902; 414/907
[58] Field of Search ............... 414/341, 343, 345, 347, 414/786, 608, 792, 923, 900, 902, 907; 206/386, 600

[56] References Cited

U.S. PATENT DOCUMENTS

| | | | |
|---|---|---|---|
| 4,268,201 | 5/1981 | Cayton | 414/341 X |
| 4,335,992 | 6/1982 | Reeves | 414/667 |
| 4,439,093 | 3/1984 | Victorino | 414/786 |
| 4,640,657 | 2/1987 | Moore et al. | 414/347 |
| 4,655,667 | 4/1987 | Plumb et al. | 414/343 |

FOREIGN PATENT DOCUMENTS 41654  11/1973  Australia ................... 206/600

*Primary Examiner*—Robert J. Spar
*Assistant Examiner*—Janice Krizek
*Attorney, Agent, or Firm*—Phillips, Moore, Lempio & Finley

[57] ABSTRACT

A method for transferring filled lettuce cartons from a field to a loading dock for shipment to an end user or buyer includes filling the cartons with head lettuce at a field site, closing and stacking the filled cartons in layers to a predetermined composite height on a plurality of adjustable pallets to form palletized carton stacks, and moving the stacks to a cooling facility and subsequently to the loading dock whereat the widths of the stacks are adjusted to fit the width of the cargo space of a transport vehicle. The stacks are then transported to the end user. In the preferred embodiment of this invention, the filled cartons are uniquely stacked on the pallets in a compact and fully supported manner whereby they remain intact on the pallets for ease of handling by lift trucks for loading and unloading purposes. Each pallet is formed from a plurality of horizontally disposed and parallel support members, defining a flat platform thereon adapted to receive the stacked cartons, and an adjustable side rail mounted on at least one end of the platform whereby the width of the pallet can be varied.

14 Claims, 7 Drawing Sheets

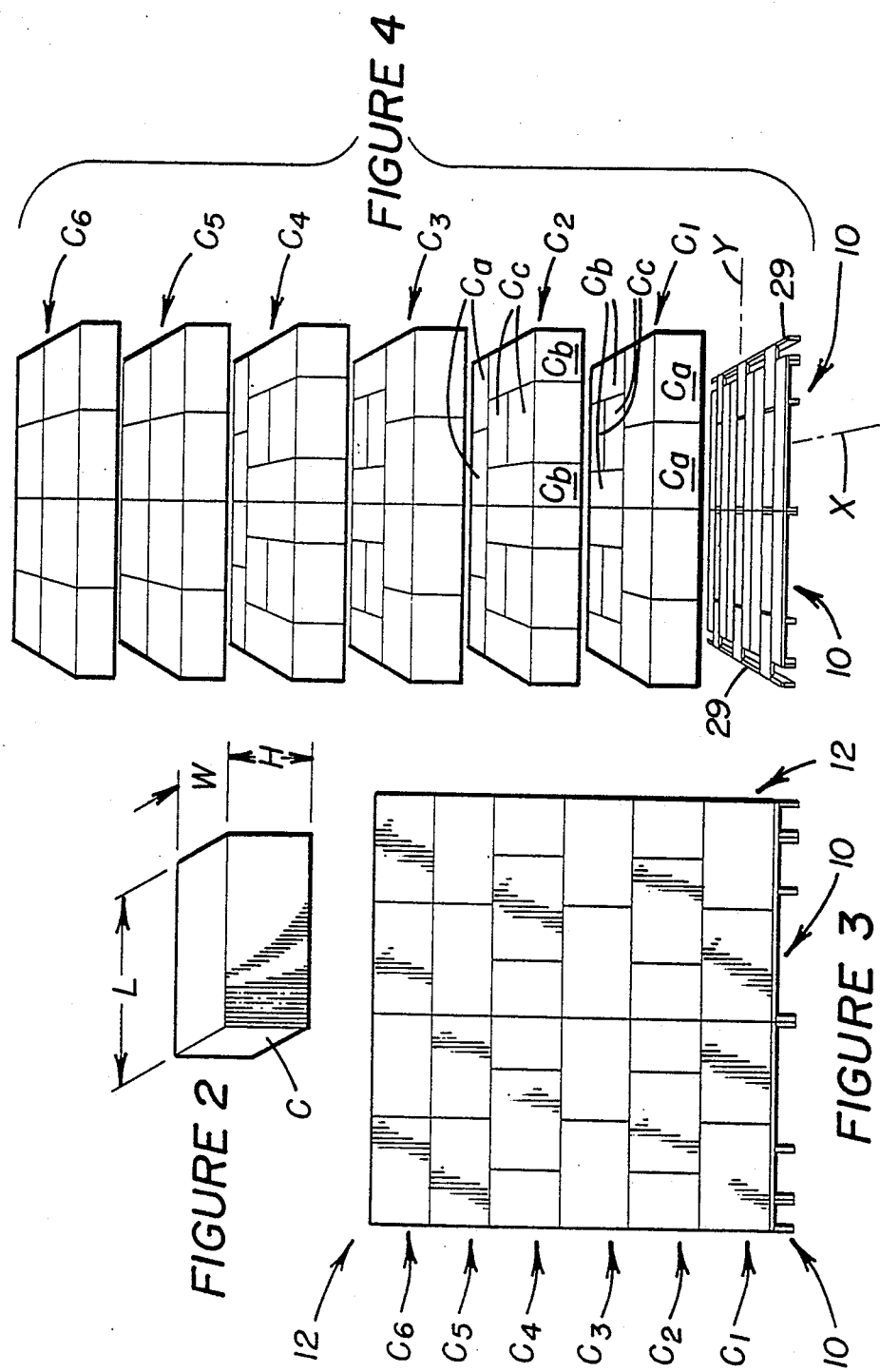

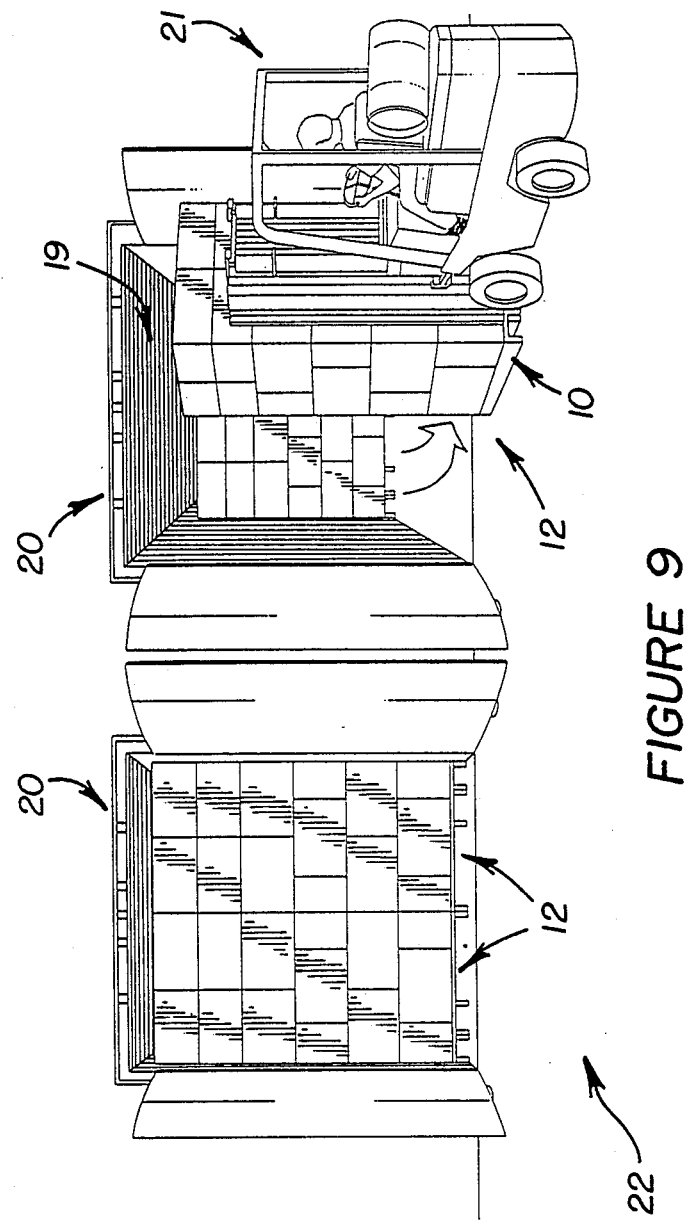

CARTON LOADING AND UNLOADING METHOD WITH ADJUSTABLE PALLET

TECHNICAL FIELD

This invention relates generally to a carton loading and unloading method and system and more particularly to the transfer of a stack of filled cartons from a field site to an end user or buyer.

BACKGROUND ART

One conventional carton handling system for loading lettuce cartons into the cargo space of a transport vehicle at a loading dock is described in U.S. Pat. No. 4,439,093. In this complex system, the pallets are removed from the stack of cartons by a depalletizing machine and the stack is then deposited onto a forklift truck that is equipped with a pusher attachment. The forklift truck then carries the stack of cartons into the cargo space of the transport vehicle whereafter the cartons are pushed-off the tines of the lift truck and onto the floor of the vehicle.

The next following stack of cartons is placed on the top of the first stack to utilize the available height of the cargo space. This loading procedure is repeated until the cargo space is at least substantially filled with cartons. This type of system gives rise to carton damage, spillage and related problems well-known to those skilled in the art.

Further, the depalletizing machine must be closely monitored by a separate workman and the loading cycle is prone to delays, primarily due to occasional pallet jam-ups and resultant damage to the pallets and cartons. Still further, a substantially large dock loading area is required to accommodate the bulky and complex depalletizing machine whereby the number of companies enabled to use this type of system is severely limited. The depalletizing machine also requires constant servicing and specially designed high voltage electrical hook ups. In addition, seasonal moves of the depalletizing machine to various locations requires its disassembly, shipment and reassembly, thus giving rise to unduly high labor and related costs.

Even more importantly, this conventional system does not facilitate mechanized removal of the cartons from the transport vehicle by the end user or buyer. In particular, the cartons must be removed manually from the transport vehicle by workmen who must then stack the individual cartons onto a standard pallet for transfer to delivery transport vehicles. In addition to giving rise to excessive labor costs, delayed unloading ensues which has proven costly and inconvenient to the end user.

A second conventional "rack loading" system involves the use of a loading rack that has a width slightly less than the average width of the cargo space of a standard transport vehicle. The cartons are stacked six layers high on the rack with two more layers of cartons being placed thereon to maximize use of the cargo space. The tines of a lift truck are then used to place the loaded rack into the cargo space with the process being repeated until the cargo space is loaded to order.

The latter system also gives rise to carton damage and related problems. Since the width of the rack is necessarily less than the width of the cargo space of a standard transport vehicle, the cartons tend to break over the ends of the racks, resulting in carton damage or breakdown. Squeezing of the cartons by the clamps of a lift truck also subjects the cartons to damage. Most importantly, this system also does not provide for the mechanical unloading of the cartons, but rather requires manual labor to do so.

A third conventional loading system, which has proven quite successful, is disclosed in U.S. Pat. No. 4,640,657. Although successful, such system also is not conducive to the mechanical unloading of cartons from a transport vehicle and requires specially designed equipment as described in this patent.

DISCLOSURE OF THE INVENTION

This invention overcomes the above, briefly described problems by providing a non-complex, efficient and economical carton loading and unloading method, preferably utilizing an adjustable pallet.

The method comprises filling a plurality of erected cartons with produce, such as head lettuce, harvested at a field site, stacking the filled cartons in fully supported relationship on a plurality of pallets to form palletized carton stacks and then moving the stacks to a cooling facility and thence to a loading dock for loading into the cargo space of a transport vehicle, upon order by an end user or buyer. The method preferably includes adjusting the widths of the stacks, including the pallets and cartons, to fit the width of the cargo space and thereafter unloading the stacks individually from the cargo space of the transport vehicle.

In the preferred embodiment of this invention, layers of cartons are uniquely stacked on each pallet to fully support the cartons for expeditious and efficient mechanical handling by forklift trucks or the like. The palletized stacks will retain their original configurations and upright dispositions throughout the entire loading and unloading cycles. Another unique feature of this invention is the ability of the end user to expeditiously unload each palletized carton stack from the transport vehicle by mechanical means, such as a forklift truck.

The adjustable pallet of this invention comprises a plurality of horizontally disposed and parallel support members collectively defining a flat platform adapted to receive stacked cartons thereon. At least one footrail is secured beneath opposite ends of the platform to define a vertical opening between the support members and ground level adapted to receive the tines of a lift truck therein and to further define a slot between adjacent pairs of support members. A guide member is slidably mounted in each slot and has an adjustable rail secured to a distal end thereof whereby the width of the platform can be adjusted to closely fit the cargo space of a transport vehicle.

BRIEF DESCRIPTION OF THE DRAWINGS

Other objects and advantages of this invention will become apparent from the following description and accompanying drawings wherein:

FIG. 2 is a perspective view, illustrating a typical carton;

FIG. 3 is a frontal elevational view of a pair of pallets each having a plurality of filled cartons stacked thereon to form a pair of palletized carton stacks;

FIG. 4 is an exploded front perspective view of the palletized carton stacks of FIG. 3;

FIG. 9 illustrates two transport vehicles backed into an unloading dock and another lift truck used to individually unload the palletized carton stacks from the cargo space of each vehicle.

BEST MODE OF CARRYING OUT THE INVENTION

General Description

Figure 1:
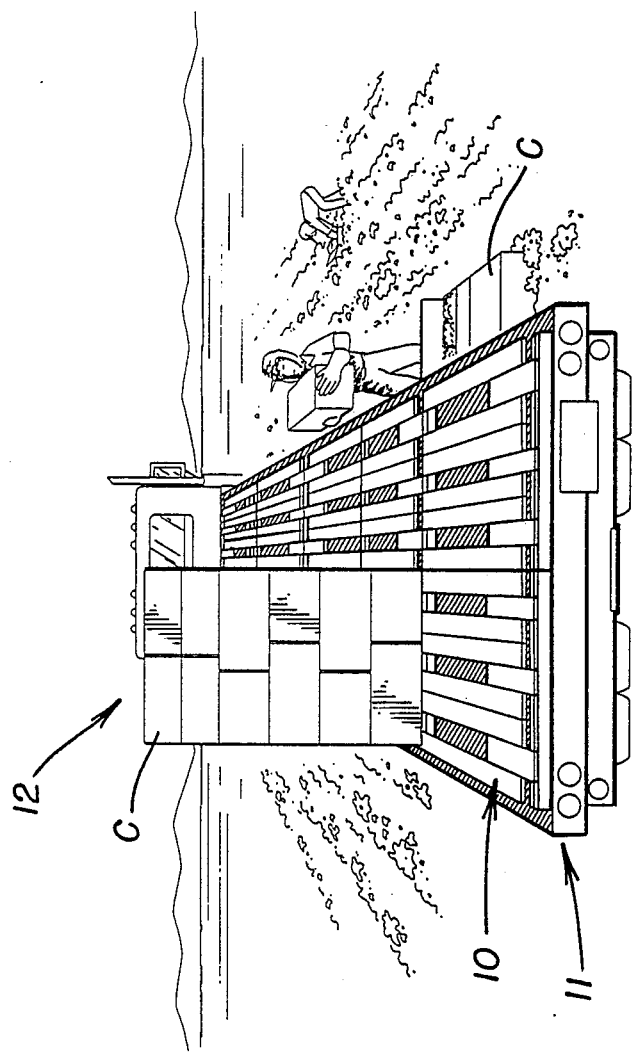
FIG. 1 is a perspective view, illustrating the loading of filled lettuce cartons onto pallets disposed on the flat bed of a truck at a field site.

FIG. 1 illustrates a field site whereat harvested lettuce is packed into cartons C to form "field packs." The cartons are filled, closed and stacked to a six-layer height on pallets 10, suitably disposed on the flatbed of a truck 11. Each pallet and supported stack of cartons thus forms a "palletized carton stack" 12. As described more fully hereinafter, the width of each pallet can be preadjusted to fully support the stack of cartons thereon. Individual layers of the cartons are uniquely stacked (FIGS. 3 and 4) to fully support bottom areas of the cartons in a unique manner for expeditious and efficient mechanical handling by forklift trucks and during transit.

Figure 5:
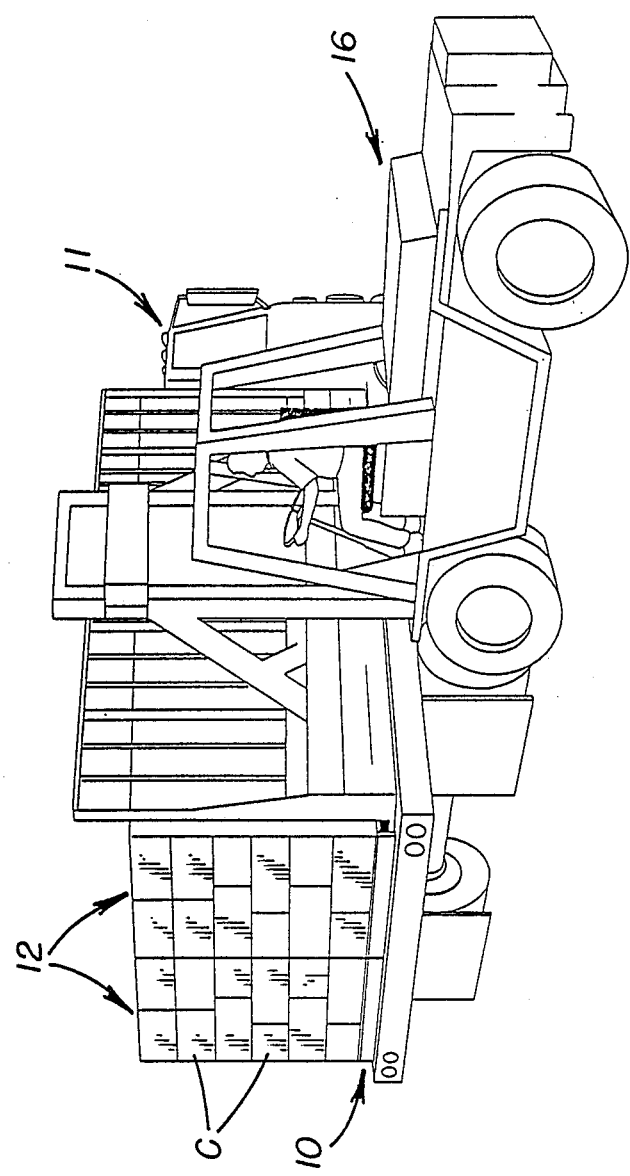
FIG. 5 illustrates a lift truck adapted to engage and lift the palletized carton stacks from the flat bed of the truck illustrated in FIG. 1.
Figure 6:
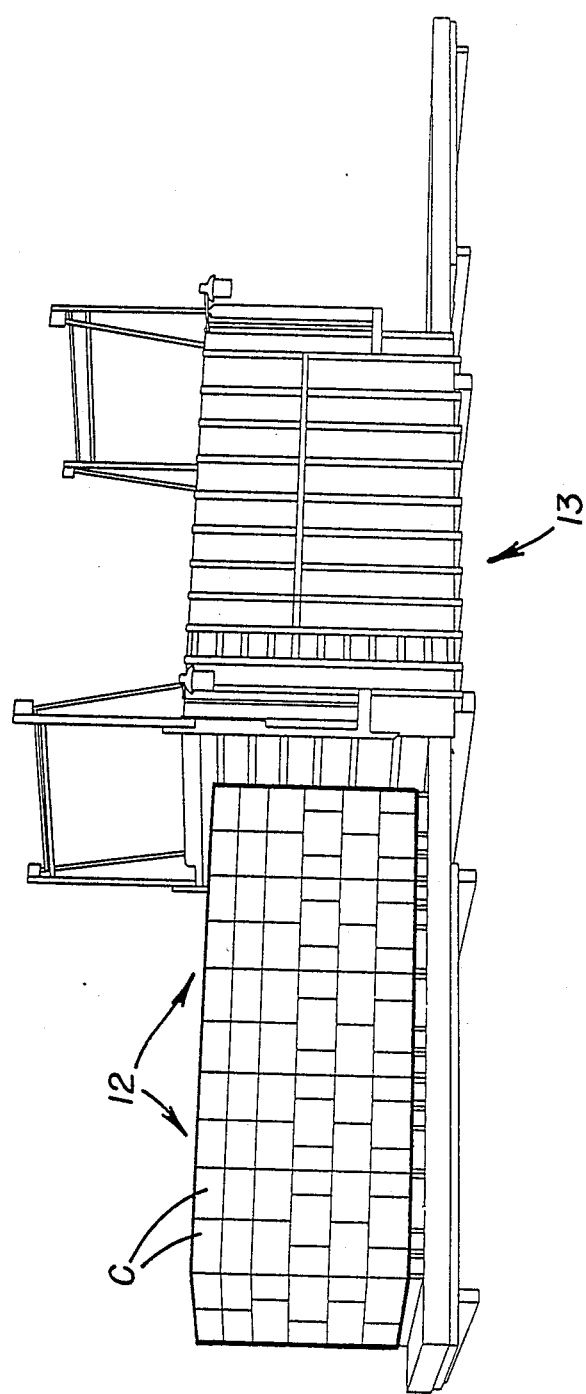
FIG. 6 illustrates the palletized carton stacks ready for passage through a standard cooling tube.
Figure 7:
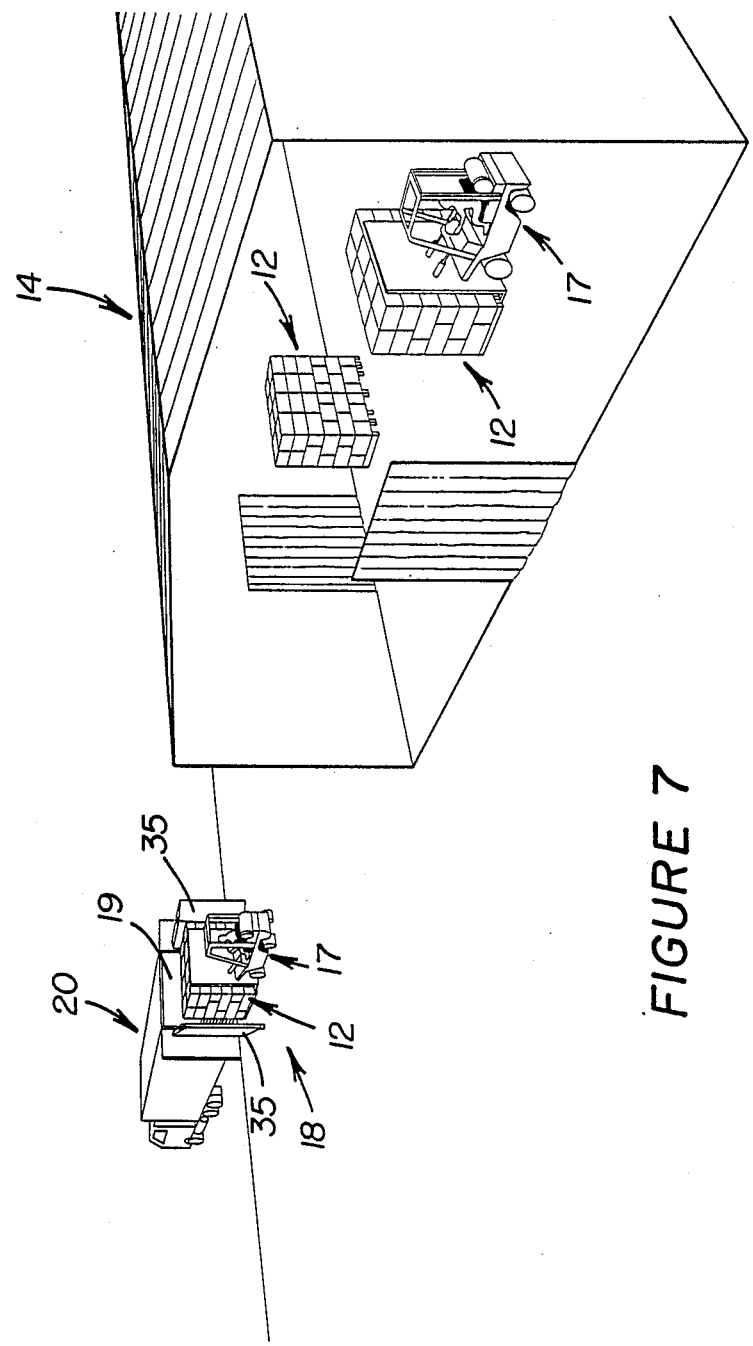
FIG. 7 illustrates the palletized carton stacks retained in a cold storage building and transfer of a pair of stacks to a transport vehicle by a forklift truck.

Referring to FIGS. 5-7, the flatbed truck then delivers the cartons to a cooling facility, including a standard pre-vacuum cooling tube 13 and a cold storage building 14, to maintain the produce, such as head lettuce, at a predetermined low temperature (e.g., 34° F.) for preservation purposes. A large lift truck 16 is used for the purpose of simultaneously removing the palletized carton stacks from the flatbed truck and transferring the stacks to the cooling facility. Thereafter, a specially designed forklift truck 17 (FIGS. 7 and 8) is used to move the stacks to a loading dock 18 and into a cargo space 19 of a transport vehicle 20, such as a large truck-trailer.

One of the unique features of this invention is the ability of cartons C to be retained in their original configurations and upright dispositions on pallets 10 throughout the entire process, from the harvest field site (FIG. 1) to removal from transport vehicle 20 (FIG. 9). As suggested above, the unique stacking of the cartons (FIGS. 3 and 4) aids the cartons in retaining their upright dispositions. Adjustable pallet 11 ensures full support of all bottom areas and corners of the bottom layer of cartons thereon. As shown in FIG. 9 another unique feature of this invention is the ability of the end user or buyer to utilize mechanical means, such as illustrated lift truck 21, to unload each palletized carton stack 12 individually.

DETAILED DESCRIPTION

Referring to FIGS. 1-4, six layers $C_1$-$C_6$ of cartons C are normally stacked on each pallet 10 to form palletized carton stack 12. As shown in FIG. 2, the normal length (L), width (W) and height (H) of an unfilled standard corrugated shipping carton is 21.5 in., 14.0 in. and 11.5 in., respectively. When the cartons are filled with head lettuce, for example, such dimensions will vary, as is well known to those skilled in the art, i.e., FIGS. 3 and 4 do not accurately depict filled cartons which in reality would have bulged sides to provide random spaces between the cartons.

The cartons are preferably stacked in the manner illustrated in FIGS. 3 and 4 to provide a solid foundation fully supporting the cartons and to substantially "square" the sides of the stack about its periphery. In order to maintain the sides of stacks of cartons square during transport on truck 11 standard removable side boards or gates (not shown) could be mounted on the sides of the flatbed with tie down cables (not shown) attached over the stacks in a conventional manner. Each layer $C_1$ through $C_6$ of the cartons has a vertical height no greater than the width (14.0 in.) of the cartons with the cartons of the bottom or first layer $C_1$ being oriented differently than the cartons of second layer $C_2$, relative to a longitudinal axis X of pallet 10. The bottom areas and corners of first layer $C_1$ are fully supported on the pallet.

The first layer constitutes six cartons $C_a$-$C_c$ with the frontal two cartons $C_a$ being placed end to end to provide a composite width thereat of 43.0 in. (double the length L of 21.5 in. for each carton). The width of the stack is taken in the direction of axis Y, perpendicular to longitudinal axis X of each pallet 10. The two outer cartons $C_b$, extending rearwardly from the outer ends of the frontal two cartons, are oriented to extend lengthwise (L) in the direction of axis X and are placed on their sides (H) whereby the combined length or depth of the first layer is 33.0 in. (11.5 in. plus 21.5 in.). The lengths L of two intermediate cartons $C_c$, disposed on their sides (H) between cartons $C_b$, extend lengthwise (L) in the direction of axis Y and are bounded by the frontal and outer cartons.

Second layer $C_2$ also constituting six cartons $C_a$-$C_c$, rest on the first layer and are stacked in a reverse manner, front to rear, as illustrated in FIG. 4. As a result, some of the cartons of each of the first and second layers have their heights (H) vertically disposed and the remaining cartons of the layers have their widths (W) vertically disposed. Thus, the cartons of second layer $C_2$ overlap the parting seams defined between the adjacent cartons of first layer $C_1$ to fully support the second layer on the first layer.

A third layer $C_3$ is stacked on the second layer and oriented identical to first layer $C_1$ whereas a fourth layer $C_4$ is stacked on the third layer and is oriented identical to second layer $C_2$ Fifth layer $C_5$ of four cartons is stacked on fourth layer $C_4$ to position the height (H) of each carton in its normal upright or vertical disposition, illustrated in FIG. 2. Upper or sixth layer $C_6$ is stacked in a like manner.

Figure 8:
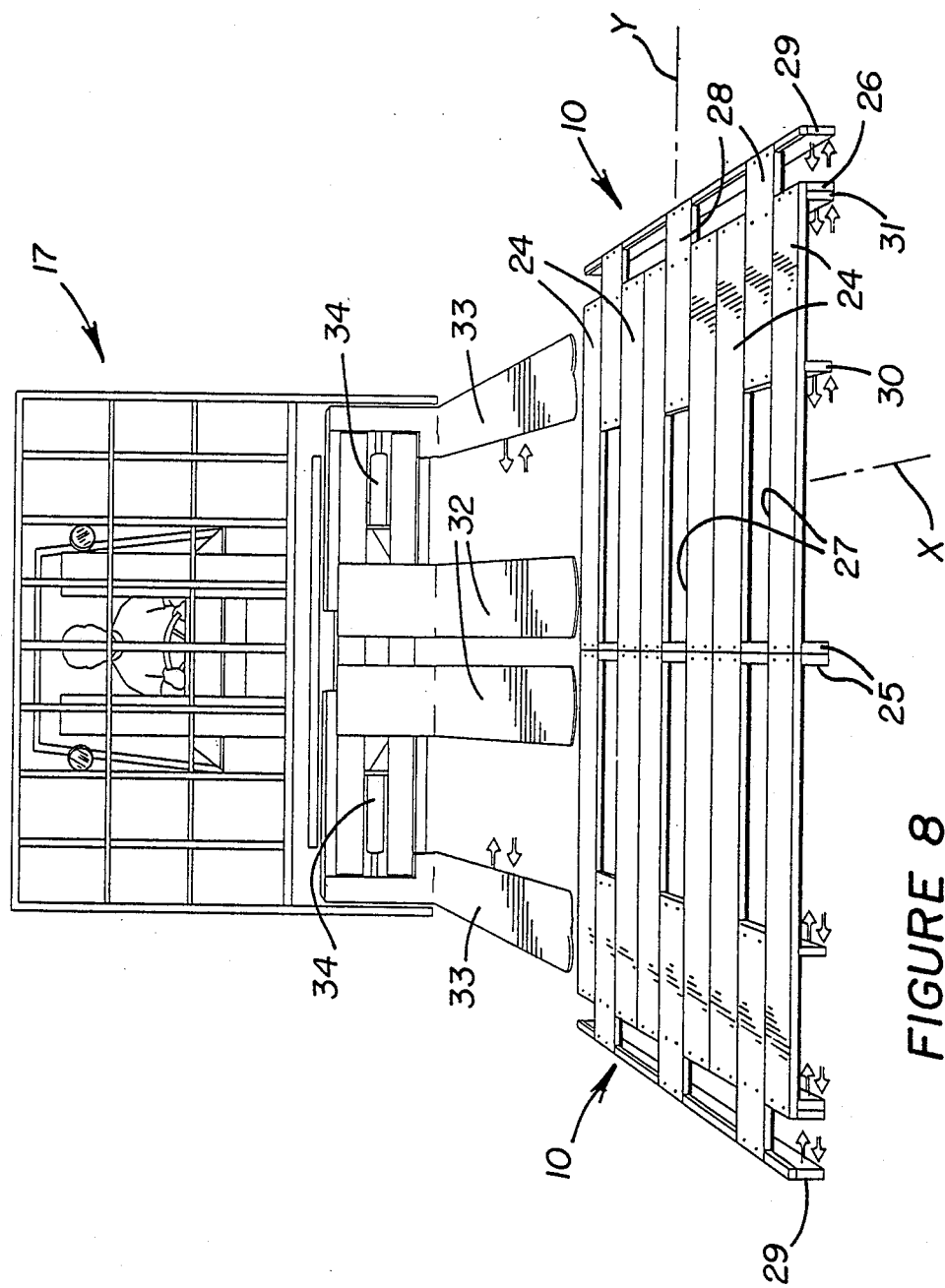
FIG. 8 is a frontal perspective view of the forklift truck of FIG. 7 and a pair of pallets positioned at ground level with the cartons removed from the pallets for clarification purposes.

Prior to when the field workmen stack the six layers of cartons on the flat bed of truck 11 (FIG. 1), the width of each pallet 10 is preadjusted to fully support the cartons thereon. As shown in FIG. 8, each pallet 10 comprises a plurality of horizontally disposed and parallel wooden support members 24 extending in the direction of axis Y, transversely relative to longitudinal axis X of the pallet. The support members collectively define a flat platform adapted to receive the stacked cartons thereon.

Wooden foot rails 25 and 26 are suitably secured beneath opposite ends of the support members and the formed platform to extend in the direction of axis X.

Vertical openings are thus defined between the platform and ground level. These openings are adapted to receive the tines of lift trucks 16 and 17 therein.

A plurality of parallel slots 27 are also defined between adjacent pairs of support members 24 with the slots extending in the direction of axis Y. Each slot terminates adjacent to an outer side of the platform and has a wooden guide member 28 slidably mounted therein. An adjustable wooden side rail 29 is secured to a distal end of each guide member 28 and is disposed in parallel relationship relative to axis X, on an outboard side of the platform.

A pair of laterally spaced guide rails 30 and 31 are secured beneath guide members 28, in the manner illustrated in FIG. 8, to retain the support members and side rail in position on the platform. In particular, inner guide rail 30 is secured beneath proximal ends of the support members whereas outer guide rail 31 is secured beneath the support members, inboard of footrail 26. Thus, FIG. 8 illustrates the maximum width of pallet 10 as dictated by engagement of guide rail 31 with the inner side of footrail 26. A corresponding adjustable side rail 29 could be mounted on the opposite end of the pallet, if so desired.

Referring to FIGS. 7 and 8, when palletized carton stacks 12 are transferred to and from cold storage building 14, a pair of pallets 10 are preferably disposed in side-to-side relationship to enable lift truck 17 to move a pair of palletized carton stacks simultaneously. The lift truck has a pair of intermediate fixed tines 32 secured forwardly thereon for positioning on either side of inner foot rails 25 of the two pallets (FIG. 8). A pair of movable outer tines 32 are mounted in a conventional manner (e.g., see U.S. Pat. No. 4,335,992) on the carriage of the lift truck for side-to-side adjustment by means of standard double-acting hydraulic cylinders 34.

Each movable tine 33 is adapted to be adjusted by the operator for insertion into the opening defined between a respective pair of guide rails 30 and 31 of each pallet. Thus, the guide rails can be shifted in the direction of axis Y to selectively vary the width of each pallet as defined by the selected position of side rail 29. As shown in FIG. 7, an operator is thus enabled to simultaneously pick up a pair of palletized carton stacks 12 and move them to transport vehicle 20 for transport to an end user or buyer.

When each pair of palletized carton stacks are moved into cargo space 19 of the vehicle, the operator is enabled to actuate one or both cylinders 34 (FIG. 8) to decrease the width of one or both of the pallets to fit within the width of the cargo space. The cartons are moved between and through a pair of standard squeeze doors 35, mounted in a stationary manner on loading dock 18, to also reduce the composite width of the carton stacks to fit within cargo space 19. When the operator has moved the palletized carton stacks into the cargo space, he can then actuate cylinders 34 to increase the composite width of the two pallets to closely fit the width of the cargo space to ensure full support of the bottom areas and ends of bottom layers $C_1$ (FIG. 3) of the stacked cartons on the pallets during transit. The cartons will normally expand against the sidewalls defining the cargo space. After the palletized carton stacks have been deposited on the floor of the truck's trailer, the process is repeated until the cargo space is loaded to order.

Referring to FIG. 9, transport of the palletized carton stacks to an unloading dock 22 then facilitates the use of a standard single pallet lift truck 21 for unloading purposes. Removal of a first one of the palletized carton stacks 12 may require the use of a standard side shift fork (not shown) on the lift truck for the purpose of narrowing and then removing the same.

The above-described method enables a company to utilize a relatively small dock loading area, eliminates the need for stationary loading apparatus and further eliminates the need for a conventional squeeze clamp truck. The method also makes use of a standard 5,000 lb. capacity lift truck 17 having a relatively inexpensive and non-complex side shift attachment for tines 33 (FIG. 8), in contrast to larger lift trucks and special push attachments required for use by conventional methods. A standard lift truck is also versatile in that it can also be used to handle other palletized carton stacks and other types of commodities commonly stored in the cold storage building 14 (FIG. 7).

Unlike other conventional loading forklifts, forklift truck 17 is enabled to load transport vehicle 20 directly from the cold storage building to thus eliminate the need for the product to stand on the loading dock for an extended period of time, prior to the loading process. The method is also very efficient since the palletized carton stack can be lifted, transported and loaded expeditiously with only one workman and a single lift truck. As described above, the outside configuration of each palletized carton stack remains substantially square and fully supported throughout travel from the field to the end user. The bottom layers of the cartons are fully supported on all bottom areas, corners and sides (when transported by transport vehicle 20) by the adjustable pallets during these cycles of the method to eliminate spillage and/or carton damage.

I claim:

1. A method for transferring cartons filled with produce from a field to a loading dock and loading said cartons into the cargo space of a transport vehicle comprising the steps of
    filling a plurality of erected cartons with produce harvested at a field site and closing said cartons, each of said cartons having a standard height, width and length,
    adjusting an outer side rail of at least one pallet of an adjacent pair of pallets to vary the composite width of the pallets,
    stacking said filled cartons in layers to a predetermined composite height and in fully supported relationship on said pallets to form at least one adjacent pair of palletized carton stacks, the width of said pallets thus being preadjusted to fully support said cartons thereon and each said pallet being disposed on a longitudinal axis thereof,
    first moving said palletized carton stacks to a cooling facility to maintain said produce at a predetermined low temperature for preservation purposes,
    second moving said palletized carton stacks to said loading dock, and
    loading said palletized carton stacks into the cargo space of said transport vehicle.

2. The method of claim 1 further comprising positioning a plurality of said pallets on the flat bed of a truck and wherein said stacking step comprises stacking said filled cartons in layers on each of said pallets to form a plurality of said palletized carton stacks.

3. The method of claim 2 wherein said first moving step comprises simultaneously removing all of said palletized carton stacks from the flat bed of said truck and moving said stacks to said cooling facility.

4. The method of claim 1 wherein said stacking step comprises at least substantially squaring the sides of said stacked cartons about their periphery and maintaining such squaring of said cartons from said filling step through said loading step.

5. The method of claim 1 wherein said stacking step comprises stacking each layer of said cartons to have a vertical height no greater than the width of said cartons with the cartons of at least a bottom first layer disposed on each said pallet being oriented differently than the cartons of a second layer disposed on said first layer, relative to the longitudinal axis of said pallet, and fully supporting the bottom areas and corners of the cartons of said first layer on said pallet.

6. The method of claim 5 wherein said stacking step further comprises stacking some of the cartons of each of said first and second layers to have their heights vertically disposed and stacking the remaining cartons of each of said first and second layers to have their widths vertically disposed.

7. The method of claim 6 wherein said stacking step further comprises stacking a third layer of cartons on said second layer and a fourth layer of cartons on said third layer with the orientations of the cartons of said first and third layers being identical and the orientations of the cartons of said second and fourth layers being identical.

8. The method of claim 7 wherein said stacking step further comprises stacking a fifth layer of cartons on said fourth layer and stacking a sixth layer of cartons on said fifth layer and wherein the cartons of each of said fifth and sixth layers are oriented to have the heights vertically disposed.

9. The method of claim 1 wherein each of said first moving, second moving and loading steps includes simultaneously handling said pair of palletized carton stacks with a lift truck.

10. The method of claim 1 wherein said loading step comprises simultaneously loading said adjacent pair of palletized carton stacks into the cargo space of said transport vehicle by a single lift truck.

11. The method of claim 10 further comprising squeezing the cartons of said pair of palletized carton stacks simultaneously prior to said loading step to reduce the composite width of said cartons to fit the width of said cargo space.

12. The method of claim 11 further comprising adjusting the composite width of the pallets of said pair of palletized carton stacks to closely fit the width of said cargo space and fully supporting the bottom areas and corners of the cartons resting on said pallets during transit.

13. The method of claim 10 further comprising transporting said palletized carton stacks to the unloading dock of an end user and removing each of said palletized carton stacks individually from said cargo space by a single forklift truck.

14. A method for transferring cartons filled with produce from a field to a loading dock and loading said cartons into the cargo space of a transport vehicle comprising the steps of
    filling a plurality of erected cartons with produce harvested at a field site and closing said cartons, each of said cartons having a standard height, width and length,
    stacking and filled cartons in layers to a predetermined composite height and in fully supported relationship on a pallet to form a palletized carton stack, the width of said pallet being preadjusted to fully support said cartons thereon and said pallet disposed on a longitudinal axis thereof,
    first moving said palletized carton stack to a cooling facility to maintain said produce at a predetermined low temperature for preservation purposes,
    second moving said palletized carton stack to said loading dock,
    squeezing the cartons of an adjacent pair of palletized carton stacks simultaneously to reduce the composite width of said cartons to fit the width of said cargo space, and
    loading said palletized carton stacks into the cargo space of said transport vehicle, including simultaneously loading said adjacent pair of palletized carton stacks into the cargo space of said transport vehicle by a single lift truck.

* * * * *